(12) United States Patent
Meng et al.

(10) Patent No.: US 11,131,798 B2
(45) Date of Patent: Sep. 28, 2021

(54) BACKLIGHT MODULE AND DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Jifeng Tan, Beijing (CN); Xiaochuan Chen, Beijing (CN); Jian Gao, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/497,524

(22) PCT Filed: Mar. 26, 2019

(86) PCT No.: PCT/CN2019/079664
§ 371 (c)(1),
(2) Date: Sep. 25, 2019

(87) PCT Pub. No.: WO2019/184906
PCT Pub. Date: Oct. 3, 2019

(65) Prior Publication Data
US 2020/0379160 A1 Dec. 3, 2020

(30) Foreign Application Priority Data
Mar. 30, 2018 (CN) .......................... 201810297117.9

(51) Int. Cl.
*G02F 1/1335* (2006.01)
*F21V 8/00* (2006.01)
*G02F 1/13357* (2006.01)

(52) U.S. Cl.
CPC ......... *G02B 6/0036* (2013.01); *G02B 6/0043* (2013.01); *G02B 6/0051* (2013.01);
(Continued)

(58) Field of Classification Search
CPC .. G02B 6/0036; G02B 6/0043; G02B 6/0051; G02B 6/0053; G02F 1/133602;
(Continued)

(56) References Cited

U.S. PATENT DOCUMENTS 6,989,873 B2    1/2006   Hua-Nan et al.
7,182,481 B2 *   2/2007   Shimura ................. G02B 3/08
                                                                   362/244
(Continued)

FOREIGN PATENT DOCUMENTS

CN        1769977 A     5/2006
CN    101093315 A    12/2007
(Continued)

OTHER PUBLICATIONS

First Office Action, including Search Report, for Chinese Patent Application No. 201810297117.9, dated Mar. 16, 2020, 13 pages.
(Continued)

*Primary Examiner* — Zheng Song
(74) *Attorney, Agent, or Firm* — Westman, Champlin & Koehler, P.A.

(57) ABSTRACT

The present disclosure provides a backlight module and a display device. The backlight module includes a tight source layer, a light guiding layer and a dotted layer, a plurality of light emitting units is arranged on the light source layer; a plurality of reflective prism units is arranged on one side of the light guiding layer away from the light source layer, and positions of the plurality of reflective prism units are corresponding to the plurality of light emitting units respectively; the reflective prism unit is configured to reflect a light emitted by the light emitting unit into the light guiding layer and cause total reflection of the reflected light within the
(Continued)

light guiding layer; and an optical structure for extracting light from the light guiding layer is provided with the dotted layer.

10 Claims, 2 Drawing Sheets

(52) U.S. Cl.
CPC ...... *G02B 6/0053* (2013.01); *G02F 1/133605* (2013.01); *G02F 1/133607* (2021.01)

(58) Field of Classification Search
CPC ......... G02F 1/133603; G02F 1/133604; G02F 1/133605; G02F 1/133609; G02F 1/133611
See application file for complete search history.

(56) References Cited

U.S. PATENT DOCUMENTS

| | | | |
|---|---|---|---|
| 7,726,828 B2* | 6/2010 | Sato | G09F 13/22 362/97.3 |
| 8,388,159 B2 | 3/2013 | Zhu et al. | |
| 8,641,219 B1* | 2/2014 | Johnson | G02B 6/0021 362/97.3 |
| 8,760,602 B2 | 6/2014 | Minami | |
| RE47,656 E * | 10/2019 | Bae | G02F 1/133603 |
| 2005/0122707 A1* | 6/2005 | Kim | G02B 6/0068 362/23.08 |
| 2006/0092662 A1 | 5/2006 | Noh et al. | |
| 2010/0079980 A1* | 4/2010 | Sakai | G02B 6/0016 362/97.1 |
| 2011/0090672 A1* | 4/2011 | Zhu | G02B 6/0021 362/97.1 |
| 2011/0194034 A1* | 8/2011 | Shimizu | G02B 6/0073 348/739 |
| 2014/0063849 A1* | 3/2014 | Chang | G02B 6/0011 362/612 |
| 2014/0133180 A1* | 5/2014 | Sakai | G02F 1/133611 362/612 |
| 2014/0239326 A1* | 8/2014 | Perng | G02F 1/133605 257/98 |
| 2019/0187514 A1* | 6/2019 | Kuniyasu | G02B 5/26 |
| 2019/0294004 A1* | 9/2019 | Hashimoto | H01L 33/507 |

FOREIGN PATENT DOCUMENTS

| | | |
|---|---|---|
| CN | 102042562 A | 5/2011 |
| CN | 203162752 U | 8/2013 |
| CN | 107315280 A | 11/2017 |
| CN | 107505769 A | 12/2017 |
| CN | 108287438 A | 7/2018 |
| JP | 5568263 B2 | 8/2014 |
| KR | 20110097302 A | 8/2011 |

OTHER PUBLICATIONS

International Search Report and Written Opinion, including English translation of Box V of the Written Opinion, for International Application No. PCT/CN2019/079664, dated Jul. 8, 2019, 15 pages.

* cited by examiner

BACKLIGHT MODULE AND DISPLAY DEVICE

CROSS-REFERENCE TO RELATED APPLICATION

This application is the U.S. national phase of PCT Application No. PCT/CN2019/079664 filed on Mar. 26, 2019, which claims priority to Chinese Patent Application No. 201810297117.9 filed in China on Mar. 30, 2018, the disclosures of which are incorporated in their entirety by reference herein.

TECHNICAL FIELD

The present disclosure relates to a field of a display technology, and in particular to a back light module and a display device.

BACKGROUND

With rapid development of a display technology, a liquid crystal display device has become one of the most popular display devices. In the liquid crystal display device, a backlight is usually a Light Emitting Diode (LED) light source, and the LED light source is a point light source. There are many LED light sources distributed on a liquid crystal display panel evenly. Because light energy of the LED light source is concentrated relatively, in this way, a phenomenon of uneven alternation of light and shade may occur in backlight display, and the display effect would be affected.

In order to improve the display effect of the display device, a LED light source of a direct-type display device in the related art may improve the uniformity of the backlight display by reserving a mixing distance and increasing a density of the LED light source. However, not only a thickness of the display device but also a cost is increased.

SUMMARY

On one hand, embodiments of the present disclosure provide a backlight module including a light source layer, a light guiding layer and a dotted layer, wherein
  a plurality of light emitting units is arranged on the light source layer;
  a plurality of reflective prism units is arranged on one side of the light guiding layer away from the light source layer, the positions of the plurality of reflective prism units are corresponding to positions of the plurality of light emitting units respectively; the reflective prism unit is configured to reflect a light emitted by the light emitting unit into the light guiding layer and cause total reflection of the reflected light within the light guiding layer; and
  an optical structure for extracting light from the light guiding layer is provided within the dotted layer.

Furthermore, the reflective prism unit includes: a first prism module, an orthographic projection of the first prism module on the light guiding layer has a circular shape, and a center of the circular orthographic projection corresponds to a light emitting center of the light emitting unit, a thickness of the first prism module is decreased from an edge to the center of the circle sequentially.

Furthermore, the reflective prism unit further includes: at least a second prism module, an orthographic projection of each second prism module on the light guiding layer has a circular shape, the orthographic projections of a plurality of second prism modules on the guiding layer surround the orthographic projection of the first prism module on the light guiding layer in sequence, and are concentric with the orthographic projection of the first prism module on the light guiding layer, a thickness of each second prism module is decreased from an edge to the center of the circle sequentially.

Furthermore, a surface of the first prism module away from the light guiding layer is a first surface, the first surface forms a first straight line in a radial cross section of the first prism module; a surface in each second prism module away from the light guiding layer is a second surface, and each second surface forms a second straight line in a radial cross section of the second prism module.

Furthermore, a first angle is formed between the first straight line and the light guiding layer, and second angles are formed between a plurality of the second straight lines and the light guiding layer, the first angle is larger than any one of the second angles, the second angle of a second prism module close to the first prism module is larger than the second angle of a second prism module away from the first prism module.

Furthermore, the first prism module and the plurality of second prism modules are integrally formed.

Furthermore, the backlight module further including a diffusion layer arranged on one side of the dotted layer away from the light guiding layer.

Furthermore, the backlight module further including a prism film arranged on one side of the diffusion layer away from the dotted layer.

Furthermore, the dotted layer and the light source layer are respectively arranged on the opposite surfaces of the light guiding layer.

Furthermore, the dotted layer and the light source layer are arranged on a same side of the light guiding layer.

Furthermore, the backlight module further including a diffusion layer and a prism film, the diffusion layer is arranged on one side of the dotted layer away from the light guiding layer, the prism film is arranged on one side of the diffusion layer away from the dotted layer.

Furthermore, the backlight module further including a reflective layer arranged on one side of the light guiding layer away from the dotted layer.

Furthermore, the light source layer is arranged between the light guiding layer and the dotted layer, and the plurality of reflective prism units are arranged between the reflective layer and the light guiding layer.

Furthermore, the light source layer is arranged between the reflective layer and the light guiding layer, and the plurality of reflective prism units are arranged between the light guiding layer and the dotted layer.

On another hand, embodiments of the present disclosure provide a display device including the backlight module described above.

DETAILED DESCRIPTION

In order to further elaborate technical means and effects adopted by the present disclosure for achieving a purpose of an intended invention, detailed implementation modes, structures, characteristics and effects of the backlight module provided by the present disclosure will be illustrated in detail hereinafter with reference to the accompanying drawings and optional embodiments.

Figure 1:
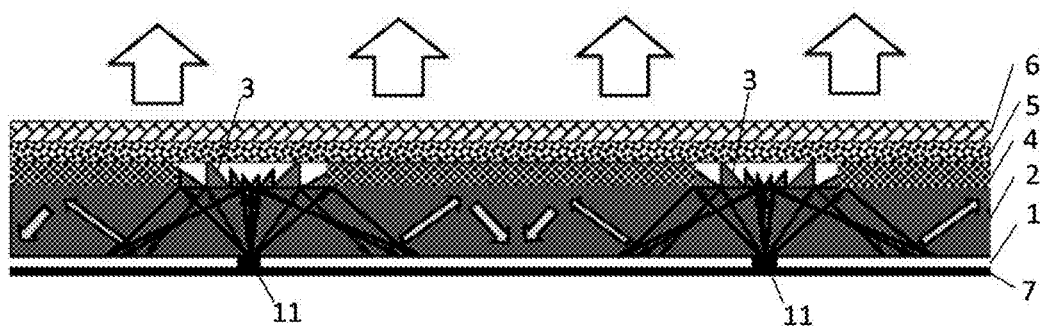
FIG. 1 is a schematic diagram illustrating a structure of a backlight module according to some embodiments of the present disclosure.

As shown in FIG. 1, embodiments of the present disclosure provide a backlight module, including a light source layer 1, a light guiding layer 2 and a dotted layer 4.

A plurality of light emitting units 11 is arranged on the light source layer 1.

The light guiding layer 2 is arranged on one side of the light source layer 1, a plurality of reflective prism units 3 is arranged on one side of the light guiding layer 2 away from the light source layer 1, the positions of the plurality of reflective prism units 3 are corresponding to positions of the plurality of light emitting units 11 respectively; the reflective prism unit 3 is configured to reflect a light emitted by the light emitting unit 11 into the light guiding layer 2 and cause the light to propagate transversely in the light guiding layer.

The dotted layer 4 is arranged on one side of the light guiding layer 2 used for extracting light from the light guiding layer as a backlight source.

The backlight module is mainly applied to a backlight module of a direct-type liquid crystal display, the light source layer 1 is taken as the light source of the backlight module, and a plurality of light emitting units 11 is arranged on the light source layer 1, the light emitting unit 11 may be a Light Emitting Diode (LED) chip, a LED light source is most commonly used as a backlight source in the direct-type liquid crystal display, and has characteristics of long life, small size and low energy consumption. A plurality of the LED chips may be evenly arranged on the light source layer 1 as light sources.

The light guiding layer 2 may be made of a transparent material. For example, the light guiding layer 2 may be made of a transparent medium material with refractive index of 1.5, such as ITO or $Si_3N_4$. A thickness of the light guiding layer 2 may be between 2 micron and 1 mm, which is not limited herein. A plurality of reflective prism units 3 is arranged on one side of the light guiding layer 2 away from the light source layer 1, each light emitting unit 11 is corresponding to one of the reflective prism units 3. Most of light emitted by each light emitting unit 11 may irradiate on the corresponding reflective prism unit 3 after passing through the light guiding layer 2. Under an action of the reflective prism, the light illuminated on the reflective prism unit 3 may transversely propagate in the light guiding layer 2 in a form of total reflection. An appropriate dotted layer structure may be arranged above the light guiding layer 2, the dotted layer 4 may be a grating structure, for example. The dotted layer 4 is configured to extract the light from the light guiding layer 2. The light in the light guiding layer 2 may pass through the light guiding layer 2 by grating diffracting of the dotted layer to achieve backlight illumination.

Embodiments of the present disclosure provide a backlight module capable of reducing a quantity of the light emitting units as well as a thickness of the backlight module. In the related art, a LED light source of a direct-type display device may improve the uniformity of the backlight display by reserving a mixing distance and increasing a density of the LED light source. However, not only a thickness of the display device but also a cost is increased. Compared with the related art, the present disclosure provides a backlight module, including a light source layer, a light guiding layer and a dotted layer, a plurality of light emitting units is arranged on the light source layer; the light guiding layer is arranged on one side of the light source layer, a plurality of reflective prism units is arranged on one side of the light guiding layer away from the light source layer, the positions of the plurality of reflective prism units are corresponding to positions of the plurality of light emitting units respectively; the reflective prism unit is configured to reflect a light emitted by the light emitting unit into the light guiding layer, so that the light is sufficiently mixed by total reflection in the light guiding layer, and improved backlight uniformity may thus be obtained by using fewer light emitting units. Therefore, a density of the light emitting units may be reduced, a cost may be reduced, and since a thickness of the light guiding layer is much smaller than the reserved light-mixing distance of the LED light source in the related art, the thickness of the display device can be further reduced.

Figure 2:
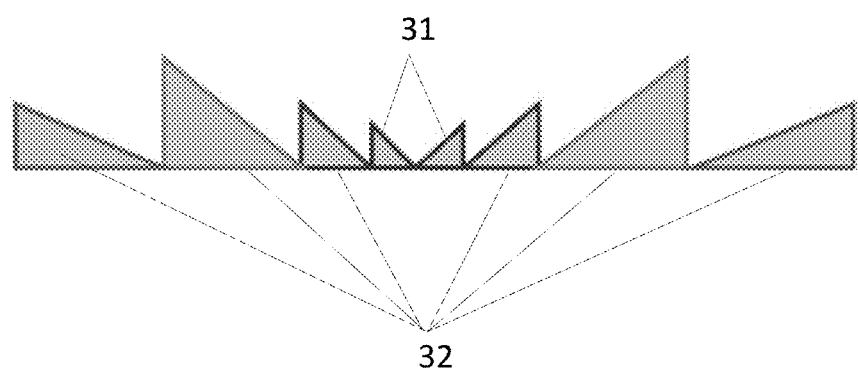
FIG. 2 is a schematic sectional view illustrating a reflective prism unit according to some embodiments of the present disclosure.
Figure 3:
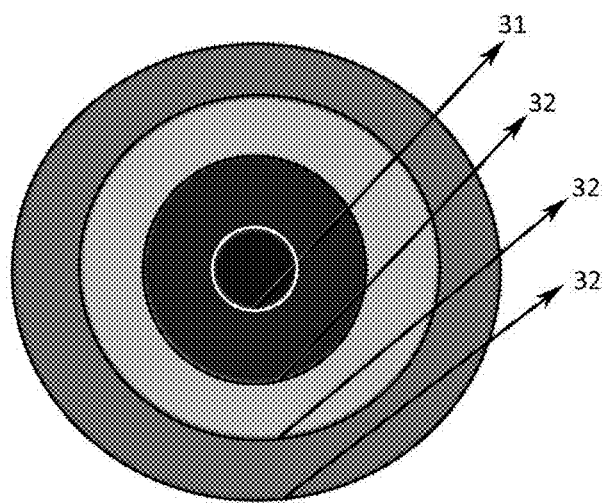
FIG. 3 is a schematic diagram illustrating a top view of a reflective prism unit according to some embodiments of the present disclosure.

Structural forms of the reflective prism unit 3 may be varied, as shown in FIG. 2 and FIG. 3, optionally, the reflective prism unit 3 includes: a first prism module 31, an orthographic projection of the first prism module 31 on the light guiding layer 2 has a circular shape, and a center of the circular orthographic projection is corresponding to a light emitting center of the light emitting unit 11, a thickness of the first prism module 31 is decreased from an edge to the center of the circle sequentially. In the embodiment, the reflective prism is made of a transparent material. The thickness of the first prism module 31 is decreased from the edge to the center of the circle sequentially, so that a groove is formed in the middle of the first prism module 31, and the groove may be a tapered groove or a hemispherical groove, which is not specifically limited herein.

Figure 4:
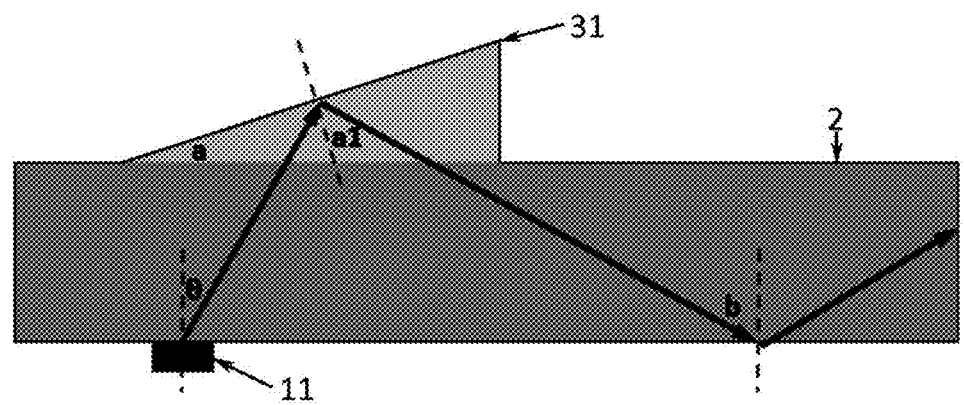
FIG. 4 is a schematic diagram of a backlight module according to some embodiments of the present disclosure.

As shown in FIG. 4, when the light emitted by the light emitting unit 11 enters the reflective prism unit 3 through the light guiding layer 2, an angle a is formed between the upper surface of the first prism module 31 and the light guiding layer 2, and a reflection angle of the light in the first prism module 31 is a1. By appropriately designing the angle a, an incident light may be reflected back to the light guiding layer 2 at an appropriate angle on a slope of the first prism module 31, and then the light may transversely propagate in the light guiding layer 2 in a form of total reflection. In an exemplary embodiment shown in FIG. 4, the light reflected by the first prism module 31 irradiates on a substrate at an incident angle b, and the incident angle b may be made not less than a critical angle by appropriately designing the angle a, thereby realizing that the light emitted by the light emitting unit 11 is sufficiently mixed by repeated total reflection in the light guiding layer 2. And a structure of the first prism module is simplified, which reduces a production cost.

The first prism module 31 may be made of the same transparent material as the light guiding layer 2, or may be made of a different material. In the exemplary embodiment of FIG. 4, the first prism module 31 and the light guiding layer 2 are made of the same material. By appropriately designing the angle a, i.e., an inclined angle of the slope of the first prism module 31 with respect to the light guiding layer 2, the incident angle of the light on the slope of the first prism module 31 is larger than the critical angle, thereby ensuring that the light irradiating on the slope of the first prism module 31 may be reflected back into the light guiding layer 2.

In addition, according to some embodiments of the present disclosure, the slope of the first prism module 31 may be partially or entirely coated with a high reflectivity layer, such as a metal film layer or other material layer with a high reflectivity, so that the light irradiating on the slope of the first prism module 31 may be more reflected.

Figure 5:
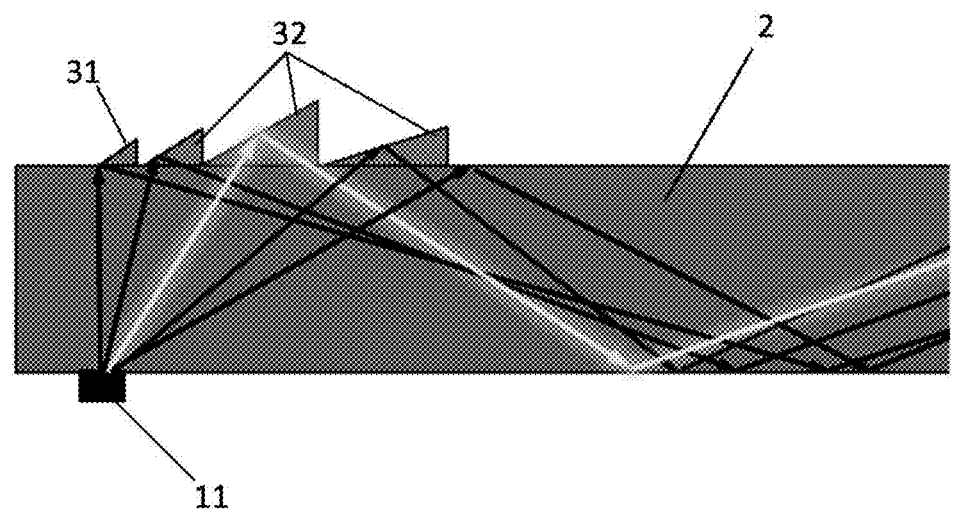
FIG. 5 is a schematic diagram illustrating a light transmission in a backlight module according to some embodiments of the present disclosure.

Since a light emitting angle of the light emitting unit 11 is divergent, in order to make more light emitted by the light emitting unit 11 enter the light guiding layer 2, as shown in FIG. 2, FIG. 3 and FIG. 5, optionally, the reflective prism unit 3 further includes: at least a second prism module 32, an orthographic projection of each second prism module 32 on the light guiding layer 2 has a circular shape, a plurality of second prism modules 32 surround the first prism module 31, and are concentric with the first prism module 31, a thickness of each second prism module 32 is decreased from an edge to the center of the circle sequentially. In the embodiment, the plurality of second prism modules 32 surround the first prism module 31, for example, the plurality of second prism modules 32 include a first sub-module, a second sub-module and a third sub-module, and orthographic projections of the first sub-module, the second sub-module and the third sub-module are all circular. The first sub-module surrounds the first prism module 31, the second sub-module surrounds the first sub-module, and the third sub-module surrounds the second sub-module, so that the first prism module 31, the first sub-module, the second sub-module and the third sub-module are coupled to each other to form the reflective prism unit 3. A radial cross-sectional shape of the second prism module 32 may be a right-angled triangle and a hypotenuse of the right-angled triangle may be a upper surface of the second prism module 32, the reflection principle of each second prism module 32 is the same as that of the first prism module 31, and each second prism module 32 and each first prism module 31 may be made of the same material, which is not repeated herein. By arranging the plurality of second prism modules 32, a coverage area of the reflective prism unit 3 may be increased, so that more light emitted by the light emitting unit 11 may enter the light guiding layer.

Furthermore, a surface of the first prism module away from the light guiding layer is a first surface, the first surface forms a first straight line in a radial cross section of the first prism module; a surface of each second prism module away from the light guiding layer is a second surface, and each second surface forms a second straight line in a radial cross section of the second prism module. In the embodiment, the surface of the first prism module away from the light guiding layer is the first surface, and the first surface is a concave surface of the first prism module. Because the first surface forms the first straight line in the radial cross section of the first prism module, the first surface is an inverted conical surface. Since in the radial section of the first prism module, the first straight line is to reflect the light, and the total reflection of the light may be achieved by designing the angle between the first straight line and the light guiding layer, thereby improving the uniformity of the backlight. Similarly, the total reflection of the light may be achieved by designing the angle between the second straight line in the radial section of the second prism module and the light guiding layer, thereby improving the uniformity of the backlight.

In order to achieve total reflection of the light irradiating on reflective prism unit, optionally, a first angle is formed between the first straight line and the light guiding layer, and second angles are formed between a plurality of the second straight lines and the light guiding layer, the first angle is larger than any one of the second angles, wherein, the second angle of the second prism module 32 close to the first prism module 31 is larger than the second angle of the second prism module 32 away from the first prism module 31. In the embodiment, since the plurality of second prism modules 32 are sequentially away from the center of the first prism module 31, angle θ is gradually increased. As shown in FIG. 4 and FIG. 5, as the angle θ is increased, an incident angle of the light in the light guiding layer is increased. If the incident angle is too large, the light in the light guiding layer may exit from the light guiding layer and may not propagate in the light guiding layer. In order to ensure that the light may propagate in the light guiding layer, a reflection angle of the light in the light guiding layer may be reduced by reducing the angle a, so that the second angle of a second prism module away from the center of the circle is smaller, and the emitted light may transversely propagate in the light guiding layer in a form of total reflection.

Furthermore, the first prism module 31 and the plurality of second prism modules 32 are integrally formed. In the embodiment, since the first prism module 31 and the plurality of second prism modules 32 are integrally formed, no gap is generated between the adjacent two prism modules, so that light rays emitted by the light emitting unit 11 within an range of a preset angle may be reflected into the light guiding layer 2 through the reflective prism unit 3 to avoid an occurrence of light leakage. In addition, the reflective prism unit 3 formed integrally is more convenient to process and assemble.

In addition to the light guiding layer 2 and the light source layer 1, the backlight module may include other functional layers, as shown in FIG. 1, optionally, the backlight module may include a diffusion layer 5 and a prism film 6, wherein the diffusion layer 5 is arranged on one side of the dotted layer 4 away from the light guiding layer 2, and the prism film 6 is arranged on one side of the diffusion layer 5 away from the dotted layer 4. In the embodiment, the diffusion layer 5 may be composed of polymer with a high transmittance (for example, polycarbonate or the like) and scattering particles (such as titanium dioxide or the like) doped therein, or may be a laminated structure of a multilayer film. The diffusion layer 5 is used for scattering the light incident into the diffusion layer 5 to achieve a uniform distribution of an intensity of the backlight; the prism film 6 may be formed by a prism layer with a sharp-angled microprism structure and a substrate layer. A main function of the prism film 6 is to further diffuse the light to ensure the uniformity of the intensity of the backlight.

Furthermore, the backlight module may further include a reflective layer 7. According to some embodiments of the present disclosure, the reflective layer 7 may be arranged on one side of the light guiding layer 2 away from the dotted layer 4. By the arrangement of the reflective layer 7, the light irradiating on the reflective layer 7 may be reflected upward so that the light may re-enter the light guiding layer 2. The reflective layer 7 may be a metal film layer or a multilayer dielectric film, which is not specifically limited herein.

Figure 6:
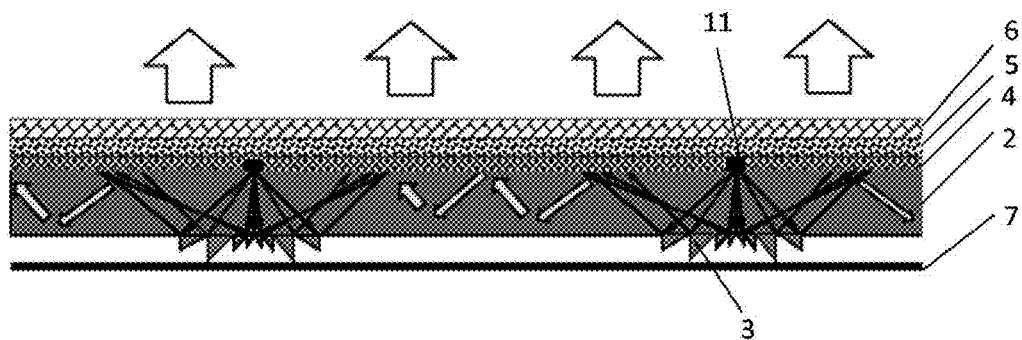
FIG. 6 is a schematic diagram illustrating a structure of a backlight module according to some embodiments of the present disclosure.

There are at least two arrangements of the light source layer 1 with respect to the reflective layer 7 and the dotted layer 4. As shown in FIG. 6, optionally, the light source layer 1 is arranged between the light guiding layer 2 and the dotted layer 4, and the plurality of reflective prism units are arranged between the reflective layer 7 and the light guiding layer 2. The backlight module may be a LED bottom-emitting backlight module. As shown in FIG. 1, optionally, the light source layer 1 is arranged between the reflective layer 7 and the light guiding layer 2, and the plurality of reflective prism units are arranged between the light guiding layer 2 and the dotted layer 4. The backlight module may be a LED top-emitting backlight module. Therefore, structural forms of the backlight module may be varied according to a type of the display device, which is not specifically limited herein.

The backlight module provided by the embodiments of the present disclosure may reduce a quantity of the light emitting units as well as a thickness of the backlight module. In the related art, a LED light source of a direct-type display device may improve the uniformity of the backlight display by reserving a mixing distance and increasing a density of the LED light source. However, not only a thickness of the display device but also a cost is increased. Compared with the related art, the present disclosure provides a backlight module, including a light source layer, a light guiding layer and a dotted layer, a plurality of light emitting units is arranged on the light source layer; the light guiding layer is arranged on one side of the light source layer, a plurality of reflective prism units is arranged on one side of the light guiding layer away from the light source layer, the positions of the plurality of reflective prism units are corresponding to positions of the plurality of light emitting units respectively; the reflective prism unit is provided to reflect a light emitted by the light emitting unit into the light guiding layer, and the dotted layer may extract the light from the light guiding layer as a backlight source. Since the light guiding layer is a backlight source and the light emitting unit is not used as a backlight source, a density of the light emitting unit may be reduced, a cost may be reduced, and since a thickness of the light guiding layer is much smaller than the reserved light-mixing distance of the LED light source in the related art, the thickness of the display device can be further reduced.

On another hand, embodiments of the present disclosure further provides a display device including the backlight module.

Embodiments of the present disclosure provide a display device capable of reducing a quantity of the light emitting units as well as a thickness of the backlight module. In the related art, a LED light source of a direct-type display device may improve the uniformity of the backlight display by reserving a mixing distance and increasing a density of the LED light source. However, not only a thickness of the display device but also a cost is increased. Compared with the related art, the present disclosure provides a display device, including a light source layer, a light guiding layer and a dotted layer, a plurality of light emitting units is arranged on the light source layer; the light guiding layer is arranged on one side of the light source layer, a plurality of reflective prism units is arranged on one side of the light guiding layer away from the light source layer, the positions of the plurality of reflective prism units are corresponding to positions of the plurality of light emitting units respectively; the reflective prism unit is configured to reflect a light emitted by the light emitting unit into the light guiding layer, and the dotted layer may extract the light from the light guiding layer as a backlight source. Since the light guiding layer is a backlight source and the light emitting unit is not used as a backlight source, a density of the light emitting unit may be reduced, a cost may be reduced, and since a thickness of the light guiding layer is much smaller than the reserved light-mixing distance of the LED light source in the related art, the thickness of the display device can be further reduced.

The abovementioned are merely specific embodiments of the present disclosure, which may not be used to limit the present application. And any of those skilled in the art may easily think of modifications or substitutions within the technical scope of the present disclosure. It should be covered within the scope of protection of the present disclosure. Therefore, the scope of protection of the present disclosure should be determined by the scope of the claims.

What is claimed is:

1. A backlight module, comprising:
    a light source layer, wherein a plurality of light emitting units is arranged on the light source layer;
    a light guiding layer, wherein the light source layer is disposed on one side of the light guiding layer, and a plurality of reflective prism units are arranged on the other side of the light guiding layer away from the light source layer, the positions of the plurality of reflective prism units are corresponding to the plurality of light emitting units respectively, the reflective prism unit is configured to reflect a light emitted by the light emitting unit into the light guiding layer and cause total reflection of the reflected light within the light guiding layer; and
    a dotted layer provided with an optical structure for extracting light from the light guiding layer;
    wherein the reflective prism unit comprises: a first prism module, an orthographic projection of the first prism module on the light guiding layer has a circular shape, and a center of the circular orthographic projection corresponds to a light emitting center of the light emitting unit, a thickness of the first prism module is decreased from an edge to the center of the circle sequentially; and
    wherein the reflective prism unit further comprises: at least a second prism module, an orthographic projection of each second prism module on the light guiding layer has a circular shape, the orthographic projections of a plurality of second prism modules on the guiding layer surround the orthographic projection of the first prism module on the light guiding layer in sequence, and are concentric with the orthographic projection of the first prism module on the light guiding layer, a thickness of each second prism module is decreased from an edge to the center of the circle sequentially;
    a surface of the first prism module away from the light guiding layer is a first surface, the first surface forms a first straight line in a radial cross section of the first prism module, a surface of each second prism module away from the light guiding layer is a second surface, and each second surface forms a second straight line in a radial cross section of the second prism module;
    a first angle is formed between the first straight line and the light layer, and second angles are formed between a plurality of the second straight lines and the light guiding layer, the first angle is larger than any one of the second angles, the second angle of a second prism module close to the first prism module is larger than the second angle of a second prism module away from the first prism module.

2. The backlight module according to claim 1, further comprising a reflective layer arranged on one side of the light guiding layer away from the dotted layer.

3. The backlight module according to claim 2, wherein the light source layer is arranged between the light guiding layer and the dotted layer, and the plurality of reflective prism units are arranged between the reflective layer and the light guiding layer.

4. The backlight module according to claim 2, wherein the light source layer is arranged between the reflective layer and the light guiding layer, and the plurality of reflective prism units are arranged between the light guiding layer and the dotted layer.

5. The backlight module according to claim 1, further comprising a diffusion layer arranged on one side of the dotted layer away from the light guiding layer.

6. The backlight module according to claim 5, further comprising a prism film arranged on one side of the diffusion layer away from the dotted layer.

7. The backlight module according to claim 1, wherein the first prism module and the plurality of second prism modules are integrally formed.

8. The backlight module according to claim 1, wherein the dotted layer and the light source layer are arranged on the opposite surfaces of the light guiding layer respectively.

9. The backlight module according to claim 1, wherein the dotted layer and the light source layer are arranged on a same side of the light guiding layer.

10. A display device, comprising: the backlight module according to claim 1.

* * * * *